May 23, 1961  J. H. MOHRMAN  2,985,215
TIRE CLIP FOR TRACTION
Filed March 2, 1959
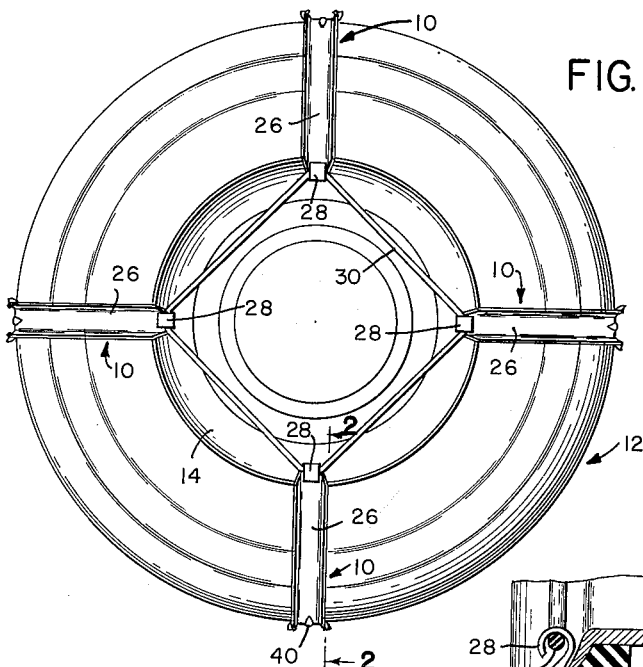
FIG. 1
FIG. 5
FIG. 2
FIG. 4
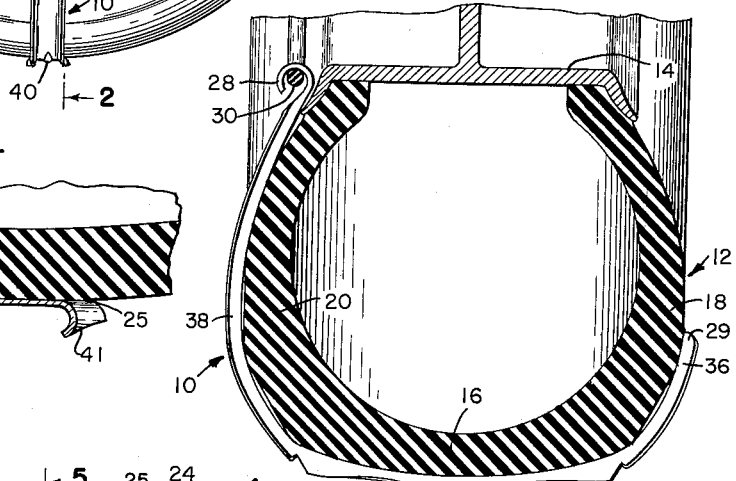
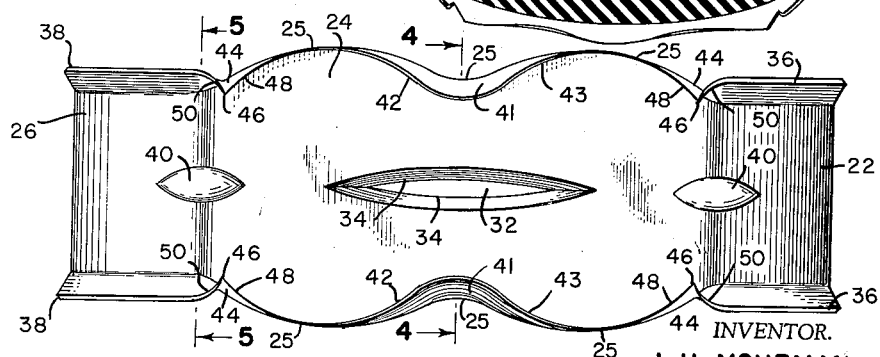
FIG. 3
INVENTOR.
J. H. MOHRMAN
BY
ATTORNEY 2,985,215
TIRE CLIP FOR TRACTION John H. Mohrman, 328 Fisher Drive, Falls Church, Va.

Filed Mar. 2, 1959, Ser. No. 796,618

5 Claims. (Cl. 152—225)

This invention relates to vehicular transportation. More particularly, this invention relates to a device for improving the traction of wheeled vehicles in movement over slippery surfaces such as ice or snow to provide more efficient transportation and to decrease the danger of collisions.

Heretofore, devices have been provided for attachment to tires of vehicles for increasing the traction of the vehicles in movement over ice and snow. Tire chains, while effective on loose snow, are relatively ineffective to prevent skidding on ice or hard packed snow. Further, tire chains require raising the car with a jack or ram for installation and removal.

Frequently, after a snowfall, drivers have applied tire chains to give sufficient traction to move their cars out of snow-filled driveways or along snowy suburban streets. Thereafter, when the highway is reached, it has been found that previous traffic has cleared the snow from the highway. Because of the direct contact of the chains with the surface of the highway, the chains wear through, the links break, and the broken ends clatter against the automobile body. The driver must then stop the car and either raise the rear with his jack, and remove the chains, or pay a service station attendant to do this for him.

Further, when a vehicle pulls away from the curb on a high-crowned road covered with ice or hard-packed snow, it has heretofore occurred that the front end of the vehicle tends to the upper part of the road while the rear wheels remain along the curb line. The vehicle thus tends to slide sideways along the road, with resultant loss of control of the vehicle and danger of collision.

It is an object of the invention to provide a device for attachment to a vehicle tire to increase traction over snow and ice and that can be readily installed and removed by hand.

A further object of the invention is to provide a tire clip that will effectively increase the traction of a vehicle on ice or hard-packed snow.

A further object of the invention is to provide a traction assembly including tire clips held at spaced positions on a tire by a readily-releasable elastic band.

A further object of the invention is to provide a device for attachment to a vehicle tire for decreasing rotational slipping and sidewise sliding.

Another object of the invention is to provide a traction tire clip that a vehicle driver can attach and remove without placing his hand behind the wheel, thereby reducing the danger of tearing or soiling his clothing.

Further objects and advantages of the invention will be apparent upon reading the following description of a physical embodiment of the invention illustrated in the accompanying drawing wherein:

Fig. 1 is an elevation of a traction assembly according to the invention including four spaced tire clips held in position by a resilient rubber band;

Fig. 2, a vertical section on line 2—2 of Fig. 1 and showing a tire clip in elevation;

Fig. 3, a bottom view of the tire clip shown in Fig. 2;

Fig. 4, a fragmentary vertical section taken on line 4—4 in Fig. 3; and

Fig. 5, a fragmentary vertical section taken on the line 5—5 of Fig. 3.

Briefly stated, the invention includes tire clips of approximate U-shape adapted to slip onto a vehicle tire and grip the tire. Each clip has a short leg portion engaging the rear wall of the tire, a tread portion engaging the tread of the tire, and a long leg portion engaging the front wall of the tire and having a hook formed at its end. A removable resilient rubber band engages the hooks of all the clips and holds them on the tire. The tread portion of each clip is split at the center. The lips on each side of the split are bent inwardly for engagement with the tread of the tire to prevent slipping of the clip on the tire.

The tread portion of each clip also includes flanges for engaging the ice or snow to increase traction by decreasing rotational slipping and sidewise sliding of the tire with respect to the roadway.

To strengthen the tire clip, convex portions are formed at the bends in the tire clip.

Referring to Fig. 1, four spaced tire clips 10 are clamped on tire 12 surrounding a rim 14 of a driven vehicle wheel. The tire includes a tread section 16, a rear side wall 18 and a front side wall 20. Each tire clip 10 may be formed of resilient material such as galvanized metal and is essentially U-shaped. The clip includes, as seen in Fig. 3, a short rear leg portion 22 engaging rear tire wall 18, a tread portion 24 having two opposite edges 25 and engaging tire tread 16, and a long front leg portion 26 engaging front tire wall 20 and terminating in a hook 28. The tire 12 is engaged by the inner surfaces of the rear leg portion 22, the tread portion 24, and front leg portion 26. The rear leg portion 22 has a terminal end 29.

The tire clip is constructed of resilient metal and has leg portions which have free ends initially spaced apart slightly less than the width of the outer portion of the tire. Thus, when the clip is applied to a tire, the leg portions will be spaced apart and, by their resiliency, grasp the tire firmly between them.

The shortness of rear leg portion 22 permits the vehicle driver to attach and remove the tire clip without placing his hand behind the tire.

Three factors contribute to hold the tire clips 10 in position on the tire 12. Firstly, the leg portions 22 and 26 resiliently grasp the tire between them. Secondly, a resilient rubber band or tire chain expander 30 engages the hooks 28 on the clips 10 and pulls the clips into tire-grasping position. Thirdly, the tread portion 24 is split at the center to form an aperture 32 therein, as shown in Fig. 3. The lips 34 are bent upwardly, as seen in Fig. 4, to dig into tire tread section 16.

So that the leg clip portions will not damage the side walls of the tire, the leg portion 22 has outwardly-extending rims 36 formed on its edges; and the leg portion 26 has outwardly-extending rims 38 formed on its edges.

To strengthen the tire clips 10, convex portions or humps 40 are formed, as seen in Figs. 1, 3 and 5, where the leg clip portions 22 and 26 are connected to the clip tread portion 24.

Traction on ice and snow is provided by traction flanges extending downwardly from the opposite edges 25 of tread clip portion 24 on the outward side of tread clip portion 24 from the tire 12. The opposite edges 25 of clip tread portion 24 are curved to form said flanges initially in a direction away from terminal end 28 of front leg portion 26 and away from the terminal end 29 of rear leg portion 22. Central flanges 41 curve downwardly and inwardly to engage the snow and ice and assist in providing forward and reverse traction. That is, they tend to prevent the spinning of the tire on the roadway without movement of the vehicle. Also, the flanges have diagonal edges 42 and 43 tending to prevent sidewise slipping of the tire.

Four end flanges 44 are formed at the opposite ends of the tread clip portion 24. Each end flange 44 has a point 46 assisting in providing forward and reverse tire traction. Further, each end flange has an inner diagonal edge 48 and an outer diagonal edge 50 for digging into the snow and ice and decreasing sidewise slipping of the tire and vehicle. The flanges have their terminal portions on the outward side of tread clip portion 24 from tire 12. The terminal flange portions extend generally parallel to tread clip portion 24.

The edges of all the flanges are sharp to provide increased traction on ice.

Both the central flanges 42 and the end flanges 44 are bent downwardly and inwardly so that the weight of the vehicle tends to press the flanges against the tread clip portion 24. This tends both to prevent straightening out of the flanges and also to maintain the flanges in position to dig into the ice and snow.

The traction assembly of the invention is installed by attaching the tire clips 10 at circumferentially-spaced intervals around the tire 12. Each tire clip 10 is attached by engaging the inner surface of rear leg portion 22 with the rear side wall 18, pulling outwardly on the front leg portion 26, and slipping the tire clip onto the tire until the inner surface of tread clip portion 24 engages the tire tread section 16. In this position the spaced leg portions resiliently grip the tire between them. Then the rubber band 30 is engaged in the hooks 28 to pull the several leg portions 26 toward the center of the wheel and thus assist in maintaining the clips in their positions on the tire.

Removal of the traction assembly is accomplished by disengaging the rubber band 30 from the hooks 28 to release the tension on the clips 10. Then the individual tire clips 10 are removed. It will be seen that the driver need not place his hand behind the tire 12 at any stage of the installation or removal. The danger of tearing or soiling clothing is thus reduced.

It will thus be seen that the invention provides a traction assembly for convenient attachment by hand to a vehicle tire that increases traction by reducing rotational slipping and sidewise sliding.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A traction assembly for attachment to a vehicle tire, said assembly comprising a plurality of generally U-shaped tire clips adapted to embrace a tire by engagement with their inner surfaces, each including a rear leg portion, a tread portion, and a front leg portion substantially longer than said rear leg portion, said front leg portion having a hook formed at its end remote from said tread portion, an endless resilient extensible element adapted to engage the hooks formed at said ends of said leg portions to releasably maintain said tire clips in position on a vehicle tire, each said tread portion having two opposed edges, said tread portions having flanges at their edges and a split therebetween extending substantially longitudinally, the lips formed at the sides of said split being bent inwardly for engagement with the tire tread, the flanges having a central portion and pointed end portions, each said pointed end portion extending toward the opposite flange, and two convex portions formed in said tire clips at the junctures of said tread portions with said front and rear leg portions, said convex portions extending in a generally outward direction.

2. For releasable engagement with a vehicle tire, a traction tire clip having a general U-shape and including a rear leg portion, a tread portion, and a front leg portion for engaging a tire on their inner surfaces, said tread portion having a part extending inwardly for engagement with the tire tread, said tread portion having two opposite edges, a central flange extending from the center of each said edge in a general direction away from the terminal ends of said front and rear leg portions, the terminal portions of said central flanges extending toward each other, an end flange extending from each said edge in a general direction away from the terminal ends of said front and rear leg portions, each said end flange having a point extending toward the opposite edge of said tread portion.

3. For releasable engagement with a vehicle tire, a traction tire clip having a general U-shape and including a rear leg portion, a tread portion, and a front leg portion for engaging a tire on their inner surfaces, said front leg portion and said rear leg portion converging toward each other when said tire clip is removed from a tire and is in unstressed condition, said tread portion having two opposite edges, said tread portion having flanges along its opposite edges, said flanges having portions extending in a direction away from the terminal ends of said front and rear leg portions, said flanges having terminal portions spaced from said clip tread portion, said terminal flange portions extending generally parallel to said clip tread portion, the terminal flange portion along one said edge extending in a direction opposite to the terminal flange portion along the opposite edge.

4. The invention as set forth in claim 3 wherein said flanges extend toward each other.

5. The invention as set forth in claim 3 and including a hook formed at the end of said front leg portion remote from said tread portion.

References Cited in the file of this patent

UNITED STATES PATENTS

| | | |
|---|---|---|
| 2,290,398 | Wellington | July 21, 1942 |
| 2,530,108 | Whichard et al. | Nov. 14, 1950 |
| 2,696,237 | Doughty | Dec. 7, 1954 |
| 2,746,508 | Doughty | May 22, 1956 |